(12) United States Patent
Proof

(10) Patent No.: US 10,807,342 B2
(45) Date of Patent: Oct. 20, 2020

(54) LAYERED TUBE AND LAYER FOR USE IN SAME

(71) Applicant: AGC CHEMICALS AMERICAS, INC., Exton, PA (US)

(72) Inventor: Joseph David Proof, Glenmoore, PA (US)

(73) Assignee: AGC CHEMICALS AMERICAS, INC., Exton, PA (US)

( * ) Notice: Subject to any disclaimer, the term of this patent is extended or adjusted under 35 U.S.C. 154(b) by 258 days.

(21) Appl. No.: 16/062,458

(22) PCT Filed: Dec. 15, 2016

(86) PCT No.: PCT/US2016/066905
§ 371 (c)(1),
(2) Date: Jun. 14, 2018

(87) PCT Pub. No.: WO2017/106484
PCT Pub. Date: Jun. 22, 2017

(65) Prior Publication Data
US 2018/0370180 A1 Dec. 27, 2018

Related U.S. Application Data

(60) Provisional application No. 62/267,474, filed on Dec. 15, 2015.

(51) Int. Cl.
*B32B 27/08* (2006.01)
*B32B 1/08* (2006.01)
(Continued)

(52) U.S. Cl.
CPC ............... *B32B 1/08* (2013.01); *B32B 27/08* (2013.01); *B32B 27/18* (2013.01); *B32B 27/26* (2013.01);
(Continued)

(58) Field of Classification Search
CPC .......... B32B 1/08; B32B 27/08; B32B 27/26; B32B 27/322; B32B 27/18; B32B 27/304;
(Continued)

(56) References Cited

U.S. PATENT DOCUMENTS 4,590,234 A 5/1986 Tasaka et al.
4,887,647 A 12/1989 Igarashi et al.
(Continued)

FOREIGN PATENT DOCUMENTS

CN 1282351 A 1/2001
CN 1644353 A 7/2005
(Continued)

OTHER PUBLICATIONS

English language abstract and machine-assisted English translation for JP 2006-104237 extracted from espacenet.com database on Sep. 17, 20183, 32 pages.
(Continued)

*Primary Examiner* — Michael C Miggins
(74) *Attorney, Agent, or Firm* — Howard & Howard Attorneys PLLC

(57) ABSTRACT

A layer for directing a hydraulic fluid includes a first fluoropolymer, a first crosslinker, and an anti-static additive. The anti-static additive includes a portion of discrete carbon nanotubes and a dispersing binder. The dispersing binder is the same as or different than the first fluoropolymer. The first fluoropolymer is present in an amount greater than 30 parts by weight, based on 100 parts by weight of the layer. The layer may be included in a layered tube. In addition to the layer, the layered tube also includes an outer layer. The outer layer includes a second fluoropolymer, which is the same as or different than the first fluoropolymer and the dispersing (Continued)

binder. The second fluoropolymer polymer is present in an amount greater than 30 parts by weight based on 100 parts by weight of the outer layer.

22 Claims, 3 Drawing Sheets

(51) Int. Cl.
  *B32B 27/26* (2006.01)
  *B32B 27/32* (2006.01)
  *F16L 11/08* (2006.01)
  *B32B 27/18* (2006.01)
  *B32B 27/30* (2006.01)
  *F16L 11/127* (2006.01)

(52) U.S. Cl.
  CPC .......... *B32B 27/304* (2013.01); *B32B 27/322* (2013.01); *F16L 11/085* (2013.01); *F16L 11/127* (2013.01); *B32B 2307/21* (2013.01); *B32B 2597/00* (2013.01)

(58) Field of Classification Search
  CPC ............. B32B 2307/21; B32B 2597/00; F16L 11/085; F16L 11/127
  See application file for complete search history.

(56) References Cited

U.S. PATENT DOCUMENTS

| | | | |
|---|---|---|---|
| 5,647,400 A | 7/1997 | Jani et al. | |
| 5,759,329 A | 6/1998 | Krause et al. | |
| 5,958,532 A | 9/1999 | Krause et al. | |
| 6,024,133 A | 2/2000 | Kodama et al. | |
| 6,089,277 A | 7/2000 | Kodama et al. | |
| 6,270,901 B1 | 8/2001 | Parsonage et al. | |
| 6,679,297 B1 | 1/2004 | Nishi et al. | |
| 6,730,385 B1 | 5/2004 | Tanaka et al. | |
| 6,849,314 B2 | 2/2005 | Jing et al. | |
| 7,205,367 B2 | 4/2007 | Funaki et al. | |
| 7,228,877 B2 | 6/2007 | Shifman | |
| RE40,516 E | 9/2008 | Parsonage et al. | |
| 7,568,505 B2 | 8/2009 | Sakazaki et al. | |
| 8,703,894 B2 | 4/2014 | Duschek et al. | |
| 9,676,716 B2 | 6/2017 | Heuer et al. | |
| 10,639,872 B2 | 5/2020 | Sato | |
| 2002/0106470 A1 | 8/2002 | Merziger et al. | |
| 2003/0198771 A1 | 10/2003 | Fukushi et al. | |
| 2004/0187948 A1 | 9/2004 | Shifman | |
| 2004/0247811 A1 | 12/2004 | DiMascio et al. | |
| 2005/0054777 A1 | 3/2005 | Lee | |
| 2006/0099368 A1 | 5/2006 | Park | |
| 2007/0044906 A1 | 3/2007 | Park | |
| 2007/0190284 A1 | 8/2007 | Park | |
| 2007/0227610 A1 | 10/2007 | Sakazaki | |
| 2007/0259147 A1 | 11/2007 | Boudry et al. | |
| 2008/0207817 A1 | 8/2008 | El Bounia | |
| 2009/0117303 A1 | 5/2009 | Goshiki | |
| 2011/0033647 A1 | 2/2011 | Hsiao et al. | |
| 2012/0073696 A1 | 3/2012 | Terada et al. | |
| 2013/0192676 A1 | 8/2013 | Gaw et al. | |
| 2014/0094541 A1 | 4/2014 | Shah et al. | |
| 2014/0246110 A1 | 9/2014 | Sarkar et al. | |
| 2015/0345670 A1 | 12/2015 | Proof | |
| 2016/0032075 A1 | 2/2016 | Seibold et al. | |

FOREIGN PATENT DOCUMENTS

| | | | |
|---|---|---|---|
| CN | 1692132 A | 11/2005 | |
| CN | 101069136 A | 11/2007 | |
| CN | 104277674 A | 1/2015 | |
| EP | 0728070 A1 | 8/1996 | |
| EP | 1156254 A1 | 11/2001 | |
| JP | S6116932 A | 1/1986 | |
| JP | S63284250 A | 11/1988 | |
| JP | H0578539 A | 3/1993 | |
| JP | H05177733 A | 7/1993 | |
| JP | H05245989 A | 9/1993 | |
| JP | 2000291849 A | 10/2000 | |
| JP | 2002516197 A | 6/2002 | |
| JP | 2002254562 A | 9/2002 | |
| JP | 2004075848 A | 3/2004 | |
| JP | 2006104237 A | 4/2006 | |
| JP | 2007503335 A | 2/2007 | |
| JP | 2010185006 A | 8/2010 | |
| JP | 2011137156 A | 7/2011 | |
| JP | 2012079996 A | 4/2012 | |
| WO | 9513186 A1 | 5/1995 | |
| WO | 2004011543 A2 | 2/2004 | |
| WO | 2005035650 A2 | 4/2005 | |
| WO | 2008093770 A1 | 8/2008 | |
| WO | 2009146146 A2 | 12/2009 | |
| WO | 2012026549 A1 | 10/2013 | |
| WO | 2014113202 A1 | 7/2014 | |
| WO | 2014170038 A1 | 10/2014 | |
| WO | 2014183101 A1 | 11/2014 | |

OTHER PUBLICATIONS

English language abstract and machine-assisted English translation for JP 2010-185006 extracted from PAJ database on Sep. 17, 2018, 6 pages.

English language abstract for JP 2011-137156 extracted from espacenet.com database on Sep. 17, 2018, 1 page.

English language abstract for CN 101069136 extracted from espacenet.com database on Nov. 11, 2019, 1 page (see also English language equivalent U.S. 2009/0117303 previously cited in Information Disclosure Statement filed Jul. 26, 2018).

English language abstract and machine-assisted English translation for CN 104277674 extracted from espacenet.com database on Nov. 11, 2019, 9 pages.

English language abstract for CN 1282351 extracted from espacenet.com database on Jun. 28, 2018, 1 page.

English language abstract for CN 1644353 extracted from espacenet.com database on Jun. 28, 2018, 1 page.

English language abstract for CN 1692132 extracted from espacenet.com database on Jun. 28, 2018, 1 page.

English language abstract and machine-assisted English translation for JPS 61-16932 extracted from espacenet.com database on May 30, 2018, 6 pages.

English language abstract for JPS 63-284250 extracted from espacenet.com database on Jun. 29, 2015, 1 page.

English language abstract and machine-assisted English translation for JPH 05-78539 extracted from espacenet.com database on Jun. 28, 2018, 9 pages.

English language abstract and machine-assisted English translation for JPH 05-177733 extracted from espacenet.com database on Jan. 31, 2018, 7 pages.

English language abstract and machine-assisted English translation for JPH 05-245989 extracted from espacenet.com database on Jan. 31, 2018, 14 pages.

English language abstract for JP 2000-291849 extracted from espacenet.com database on Jun. 28, 2018, 1 page.

English language abstract for JP 2002-254562 extracted from espacenet.com database on May 30, 2018, 1 page.

English language abstract for JP 2002-516197 extracted from espacenet.com database on Jun. 28, 2018, 2 pages.

English language abstract and machine-assisted English translation for JP 2004-075848 extracted from espacenet.com database on May 18, 2017, 15 pages.

English language abstract for JP 2007-503335 extracted from espacenet.com database on Jan. 31, 2018, 1 page.

English language abstract and machine-assisted English translation for JP 2012-079996 extracted from espacenet.com database on May 30, 2018, 21 pages.

English language abstract for WO 2012/026549 extracted from espacenet.com database on Jan. 31, 2018, 1 page.

(56) References Cited

OTHER PUBLICATIONS

English language abstract for WO 20141170038 extracted from espacenet.com database on May 18, 2017, 1 page.

International Search Report for Application No. PCT/US2013/077876 dated Apr. 3, 2014, 3 pages.

International Search Report for Application No. PCT/US2014/037604 dated Sep. 19, 2014, 4 pages.

International Search Report for Application No. PCT/US2016/066905 dated Mar. 24, 2017, 4 pages.

AGC Chemicals et al., FluonETFE Ethylene-Tetrafluoroethylene Copolymer, Jul. 2006, 38 pages.

AGC Chemicals Americas, Inc., "FluonPFA Brochure", Product Information, downloaded from www.agcchem.com on Mar. 19, 2013, pp. 1-4.

AGC Chemicals Europe, Ltd. et al., "AFLAS Fluroelastomers—AFLAS Technical Brochure", Oct. 2007, pp. 1-20.

ANS, "Carbon Nanostructure (CNS) Infusion Presentation", 2011, pp. 1-30.

ANS, "CNS Chopped Fiber", 2014, 2 pages.

ANS, "CNS Encapsulated Flakes", 2014, 2 pages.

Bolger & O'Hearn, Inc., "Advanced FluorineFree Water Repellent", 2016, 2 pages.

Bolger & O'Hearn, Inc., "Technical Data Sheet—Altopel F3", 2016, 4 pages.

Heiq Materials AG et al., "Barrier—High-Performing Durable Repellency Textile Finish", 2016, 15 pages.

Heiq Materials AG et al., "Barrier Water-Repellent", 2016, 2 pages.

SAE Aerospace, "Aerospace Standard—SAE AS5951", Issued Sep. 2004, pp. 1-30.

English language abstract of "Tetrafluroethylene-Propylene Copolymer Fluororubber", New Chemical Materials, No. 2, Dec. 31, 1978, 1 page, provided by CCPIT Patent & Trademark Law Office on Jan. 3, 2018, and original Chinese language document: "Tetrafluroethylene-Propylene Copolymer Fluororubber", New Chemical Materials, No. 2, Dec. 31, 1978, pp. 9-13.

English language abstract for WO 20081093770 extracted from espacenet.com database on Jun. 11, 2020, 2 pages.

LAYERED TUBE AND LAYER FOR USE IN SAME

CROSS-REFERENCE TO RELATED APPLICATIONS

The present application is the National Stage of International Patent Application No. PCT/US2016/066905, filed on Dec. 15, 2016, which claims the benefit of U.S. Provisional Patent Application No. 62/267,474, filed on Dec. 15, 2015, both of which are hereby expressly incorporated herein by reference in their entirety.

FIELD OF THE INVENTION

The present invention generally relates to a layered tube for directing a hydraulic fluid, and also to a layer, which may be used in the layered tube.

BACKGROUND

Conventional hose assemblies are known to convey fluids in many industries. As one example, in the aerospace industry, the hose assemblies typically include a layered tube and are commonly required to be flexible and able to withstand repeated thermal cycling with wide temperature variations (e.g. between −65° F. to 275° F. (between −55° C. and 135° C.)) during continued exposure to aggressive hydraulic fluids (e.g. SKYDROL®) and high pressure (e.g. 5,000 psi). The conventional hose assemblies, in particular the layered tube of the conventional hose assemblies, may begin to show visible signs of wear after prolonged exposure to repeated thermal cycling during exposure to the aggressive hydraulic fluids and high pressure (e.g. 5,000 psi), particularly at locations where the conventional hose assemblies are flexed or bent. More specifically, conventional hose assemblies may develop white markings or "stress" markings which typically first occur in locations where the conventional hose assembly is flexed or bent. In general, when observed at microscopic levels, these stress markings contain microscopic voids or holes. Conventional hose assemblies that have these stress markings may allow a small amount of the hydraulic fluid to migrate or seep (i.e., leak) through the microscopic voids in the conventional hose assemblies. Dust may collect on the surface of the conventional hose assemblies if the hydraulic fluid migrates or seeps through the convention hose assemblies. In the aerospace industry, conventional hose assemblies that experience leakage and/or collect dust on the surface are undesirable. As such, there remains an opportunity to develop an improved hose assembly and improved components thereof.

SUMMARY OF THE DISCLOSURE AND ADVANTAGES

The present disclosure provides a layer, which may be used in a layered tube. The layer defines a chamber for directing hydraulic fluid. The layer comprises a first fluoropolymer, a first crosslinker, and an anti-static additive. The first fluoropolymer is present in an amount greater than 30 parts by weight, based on 100 parts by weight of the layer. The anti-static additive comprises a portion of discrete carbon nanotubes and a dispersing binder that is the same as or different than the first fluoropolymer.

The layered tube comprises the layer and an outer layer that surrounds the layer. When included in the layered tube, the layer may also be referred to as an inner layer. The outer layer comprises a second fluoropolymer, which may be the same as or different than the first fluoropolymer and the dispersing binder. The second fluoropolymer is present in an amount greater than 30 parts by weight based on 100 parts by weight of the outer layer.

The present disclosure also provides a method for forming a fluoropolymer composition. In certain embodiments, the method includes using the fluoropolymer composition to form the layer.

The layer and the layered tube including the layer are both flexible and suitable for use in the aerospace industry. When included as a component in a hose assembly, the layered tube does not show visible signs of wear after repeated thermal cycling during exposure to aggressive hydraulic fluids and high pressure. As such, the layered tube does not leak nor does the layered tube develop the white, or stress, markings including the microscopic voids.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings may not be to scale and the proportion of certain elements may be exaggerated for the purpose of illustration.

DETAILED DESCRIPTION OF THE INVENTION

Figure 1:
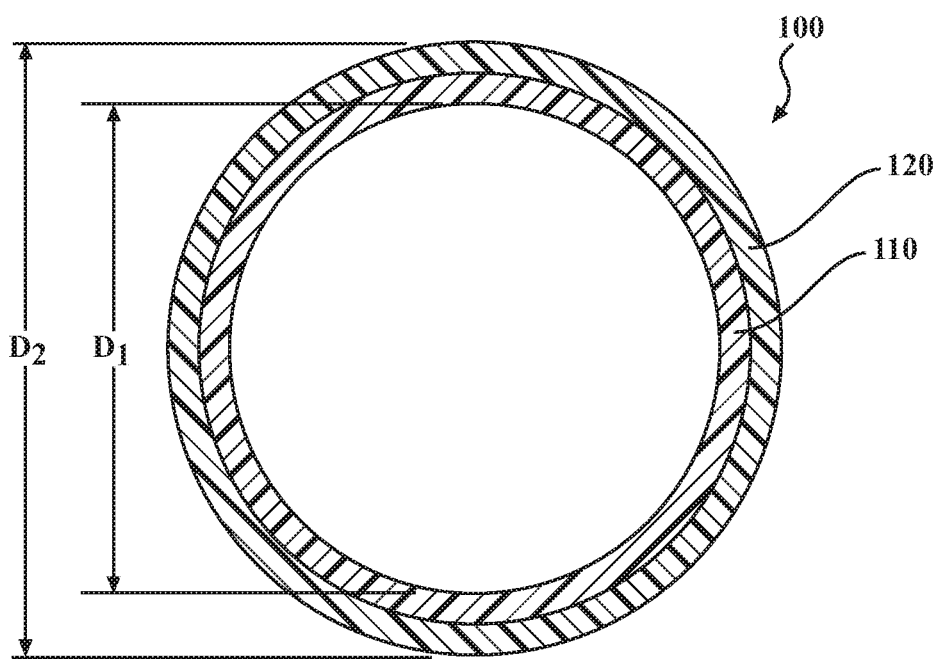
FIG. 1 is a cross sectional view of a layered tube.

As shown in FIG. 1, a layered tube 100 for directing a hydraulic fluid comprises an inner layer 110 and an outer layer 120. The inner layer 110 defines a chamber for directing a hydraulic fluid. Typically, the hydraulic fluid is highly pressurized (e.g. 5,000 psi) and chemically aggressive. An example of such a hydraulic fluid is SKYDROL®.

The inner layer 110 of the layered tube 100 may also be referred to as an inner liner, a backing layer, an inner most layer, a first layer, an inner most tube or simply a layer. The inner layer 110 is commonly referred to as the layer when not included in the layered tube 110. Likewise, the outer layer 120 may also be referred to as a second layer, an inner layer, an inner tube, or a second tube. In general, when the inner layer 110 is referred to as the inner liner, the outer layer 120 is referred to as the inner tube. For ease of reference, the inner layer 110 will only be referred to as the inner layer 110 hereinafter. Likewise, the outer layer 120 will only be referred to as the outer layer 120 hereinafter.

The inner layer 110 comprises a first fluoropolymer present in an amount greater than 30 parts by weight based on 100 parts by weight of the inner layer 110. The inner layer 110 also comprises a first crosslinker. Typically, the first crosslinker is present in an amount of from about 1 to about 10 parts by weight based on 100 parts by weight of the inner layer 110. The inner layer 110 also comprises an anti-static additive. The anti-static additive comprises a portion of discrete carbon nanotubes and a dispersing binder. The dispersing binder is the same as or different than the first fluoropolymer. In certain embodiments, the anti-static additive is present in an amount of from about 0.2 to about 3.0 parts by weight based on 100 parts by weight of the inner layer 110. The first fluoropolymer, the first crosslinker, and the anti-static additive are described in detail below.

In certain embodiments, all of the carbon nanotubes present in the inner layer 110 are present as discrete carbon nanotubes (i.e., the carbon nanotubes are not agglomerated). Alternatively, 95% of the carbon nanotubes present in the inner layer 110 are present as discrete carbon nanotubes, with the remainder of carbon nanotubes being agglomerated. Alternatively, at least 50%, 60%, 70%, 80%, or 90%, of the carbon nanotubes present in the inner layer 110 are present as discrete carbon nanotubes with the remainder of the carbon nanotubes being agglomerated.

The outer layer 120 comprises a second fluoropolymer present in an amount greater than 30 parts by weight based on 100 parts by weight of the outer layer 120. Although not required, the outer layer 120 may also comprise a third fluoropolymer that is different than the second fluoropolymer. The second fluoropolymer and the third fluoropolymer are also described in detail below.

Figure 2:
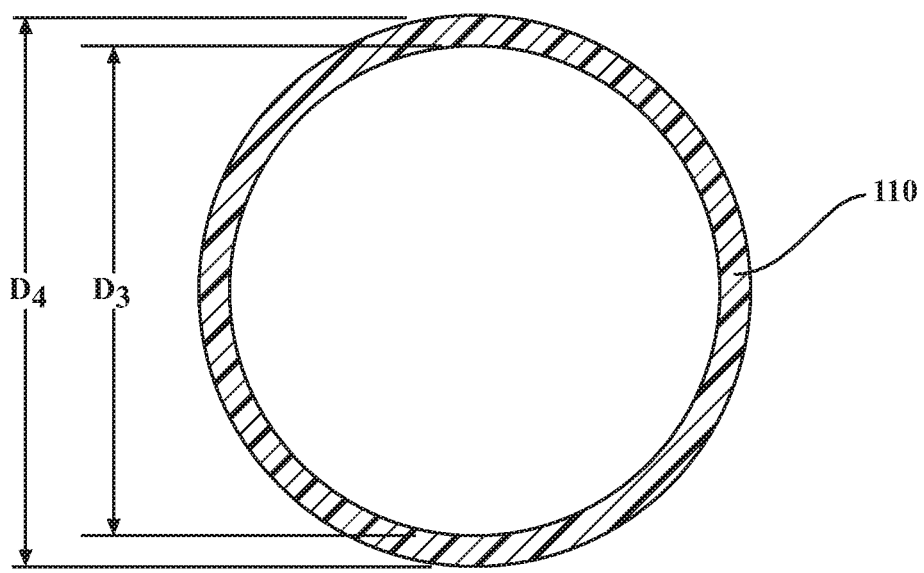
FIG. 2 is a cross sectional view of an embodiment of a layer.

Referring back to the inner layer 110, as best shown in FIG. 2, the inner layer 110 defines a chamber for directing the hydraulic fluid. The inner layer 110 has an inner diameter D1 and an outer diameter D2. The inner and outer diameter D1, D2 can vary depending upon the particular fluid conveying application involved.

As described above, the inner layer 110 comprises the first fluoropolymer present in an amount greater than 30 parts by weight based on 100 parts by weight of the inner layer 110. Alternatively, the inner layer 110 may comprise the first fluoropolymer present in an amount of from about 50 to about 98.6, from about 60 to about 87, from about 65 to about 95, from about 65 to about 87, or from about 70 to about 80, parts by weight based on 100 parts by weight of the inner layer 110.

A fluoropolymer is a polymer that contains multiple instances of bonds between fluorine and carbon. The fluoropolymer includes materials that may generally be referred to as fluoroelastomeric materials, such as fluorocarbon-based synthetic rubbers. The fluoropolymer is also generally melt processable during primary extrusion and capable of being crosslinked when exposed to sufficient conditions, which are described below.

In certain embodiments, the first fluoropolymer comprises poly(ethylene-tetrafluoroethylene) (ETFE). In other embodiments, the first fluoropolymer comprises poly(tetrafluoroethylene-co-perfluoroalkoxyethylene) (PFA). ETFE is a copolymer comprising a reaction product of ethylene and tetrafluoroethylene. PFA is a copolymer comprising a reaction product of tetrafluoroethylene and perfluoroalkoxyethylene. Typically, the first fluoropolymer comprises ETFE.

When the first fluoropolymer comprises ETFE, various grades of ETFE may be used. For example, ETFE may have a melt point of from about 200 to about 265° C. according to Differential Scanning Calorimetry (DSC). ETFE may also have a melt flow rate of from about 5 to about 50, of from about 10 to about 40, of from about 15 to about 30, or of from about 20 to about 25, grams per ten minutes (g/10 min) according to ASTMD-3159. ETFE may also have a tensile strength of from about 35 to about 50 MPa at 23° C. according to ASTM-D638. ETFE may also have a tensile elongation of from about 360 to about 450 percent at 23° C. according to ASTM-D638. ETFE may also have a flex modulus of from about 600 to about 900 MPa at 23° C. according to ASTM-D790. Suitable grades of ETFE are commercially available from AGC under the trade name FLUON®, such as FLUON® ETFE and FLUON® LM-ETFE. ETFE may be provided in any form, such as a pellet, bead, and/or powder.

In other embodiments when the first fluoropolymer comprises PFA, various grades of PFA may be used. For example, PFA may have a melt point of from about 300 to about 320° C. according to DSC. PFA may also have a melt flow rate of from about 2 to about 30 g/10 min according to ASTMD-3159. PFA may also have a tensile strength of from about 35 to about 50 MPa at 23° C. according to ASTM-D638. PFA may also have a tensile elongation of from about 320 to about 460 percent at 23° C. according to ASTM-D638. PFA may also have a flex modulus of from about 80,000 to about 110,000 psi at 23° C. according to ASTM-D790. PFA may be provided in any form, such as a pellet, bead, and/or powder.

As described above, the inner layer 110 comprises the first crosslinker. Generally, the first crosslinker is present in an amount of from about 1 to about 10 parts by weight based on 100 parts by weight of the inner layer 110. Alternatively, the inner layer 110 comprises the first crosslinker in an amount of from about 1 to about 9, from about 2 to about 8, from about 2 to about 7, from about 3 to about 6, or from about 4 to about 5, or about 4, parts by weight based on 100 parts by weight of the inner layer 110.

The first crosslinker may be present in an unreacted form in the inner layer 110. In other words, although the first crosslinker may be capable of reacting, the first crosslinker is not required to have reacted when present in the inner layer 110. Alternatively, the inner layer 110 may comprise the reaction product of the first crosslinker and the first fluoropolymer. As such, in embodiments where the first fluoropolymer is ETFE, the inner layer 110 may comprise the reaction product of ETFE and the first crosslinker.

In embodiments where the inner layer 110 comprises the first crosslinker in unreacted form, it is to be appreciated that the first crosslinker may still be capable of reacting if exposed to sufficient conditions, such as high heat or other sources of energy. For example, in one embodiment, the inner layer 110 comprises the first fluoropolymer and the first crosslinker in unreacted form, and after some period of time (e.g. 7 days) the inner layer 110 is exposed to an electron beam. After exposure to the electron beam, the inner layer 110 comprises the reaction product of the first fluoropolymer and the first crosslinker (i.e., the first crosslinker has reacted with the first fluoropolymer such that the inner layer 110 no longer comprises the first crosslinker in the unreacted form).

It is to be appreciated that when the reaction product of the first crosslinker and the first fluoropolymer (and fourth fluoropolymer if present) is expressed as a series of weight percents pertaining to the individual components that form the reaction product, the weight percent of each individual component is the weight percent of the individual component prior to the formation of the reaction product, even though the individual components may be chemically altered when forming the reaction product.

Typically, the first crosslinker is a triallyl derivative of cyanuric acid. In one embodiment, the triallyl derivative of cyanuric acid is triallyl isocyanurate (TAIC). In another embodiment, the triallyl derivative of cyanuric acid comprises TAIC, triallyl cyanurate (TAC), trimethallyl isocyanurate (TMAIC), or combinations thereof. Typically, when the first fluoropolymer is ETFE, the first crosslinker is TAIC.

As described above, the inner layer 110 also comprises the anti-static additive. As also described above, the anti-static additive comprises carbon nanotubes and the dispersing binder. The dispersing binder is the same as or different than the first fluoropolymer. In general, the anti-statics additive is present in an amount of from about 0.2 to about 3.0 parts by weight based on 100 parts by weight of the inner layer 110. Alternatively, the anti-static additive may be present in an amount of from about 0.2 to about 2.8, from about 0.2 to about 2.6, from about 0.2 to about 2.4, from about 0.2 to about 2.0, from about 0.2 to about 1.8, from about 0.4 to about 1.6, from about 0.4 to about 1.5, from about 0.6 to about 1.4, from about 0.7 to about 1.2, from about 0.7 to about 1.0, about 0.7, about 1.0, or about 1.2 parts by weight, based on 100 parts by weight of the inner layer 110.

The anti-static additive may comprise varying amounts of the carbon nanotubes and the dispersing binder. In certain embodiments, the anti-static additive comprises carbon nanotubes in an amount of from about 1 to about 99.9, from about 30 to about 99.9, from about 40 to about 99.9, from about 50 to about 99.9, from about 60 to about 99.9, from about 70 to about 99.9, from about 80 to about 99.9, from about 85 to about 99.9, from about 90 to about 99.9, from about 95 to about 99.9, about 95, or about 99.9 parts by weight, based on 100 parts by weight of the anti-static additive. Likewise, in certain embodiments, the anti-static additive comprises the dispersing binder in an amount of from about 0.1 to about 99, from about 0.1 to about 70, from about 0.1 to about 60, from about 0.1 to about 50, from about 0.1 to about 40, from about 0.1 to about 30, from about 0.1 to about 20, from about 0.1 to about 15, from about 0.1 to about 10, from about 0.1 to about 5 parts by weight, about 5 or about 0.1 parts by weight, based on 100 parts by weight of the anti-static additive. In a certain embodiment, the anti-static additive comprises about 90 to 99.9 parts by weight of carbon nanotubes and about 0.1 to about 10 parts by weight of the dispersing binder, each based on 100 parts by weight of the anti-static additive.

In general, the anti-static additive is conductive and establishes the electrical conductivity or electrical resistivity of the inner layer 110. In other words, the amount of the anti-static additive present in the inner layer 110 is directly related to the electrical conductivity or electrical resistivity of the inner layer 110. Increasing the electrical conductivity of the inner layer 110 is generally desirable when the inner layer 110 is in contact with a hydraulic fluid that is flammable. More specifically, increasing the electrical conductivity of the inner layer 110 allows the inner layer 110 to dissipate static electricity, which prevents the hydraulic fluid, when flammable, from igniting. It is to be appreciated that although the anti-static additive generally increases the conductivity of the inner layer 110, the inner layer 110 is not "truly" conductive. In other words, the electrical conductivity of the inner layer 110 is increased to a level that enables the inner layer 110 to dissipate a static charge, but the electrical conductivity is not increased to a level that enables the inner layer 110 to conduct a continuous flow of electricity. However, it is to be appreciated that despite the fact that the layer is not truly conductive, the inner layer 110 may be referred to as conductive.

In certain embodiments, the term "carbon nanotubes" of the anti-static additive refer to any of the cylindrically-shaped allotropes of carbon. Specific types of carbon nanotubes suitable for use in the anti-static additive include, but are not limited to, single-wall carbon nanotubes, double-wall carbon nanotubes, multiwall carbon nanotubes, and combinations thereof. In addition, the carbon nanotubes may be capped or uncapped. For example, when the carbon nanotubes are capped, the carbon nanotubes may be capped with a fullerene-like structure. In certain embodiments, the carbon nanotubes are multiwall carbon nanotubes.

In various embodiments, the dispersing binder is one or more polymers. As such, in embodiments with the dispersing binder including more than one polymer, the dispersing binder may include two, three, or at least four polymers. However, typically the dispersing binder is a single polymer. Suitable dispersing binders generally include thermoplastic and/or thermoset and/or elastomeric polymers.

In certain embodiments, the dispersing binder is the same as the first fluoropolymer. For example, in these embodiments, when the first fluoropolymer is ETFE, the dispersing binder is also ETFE. In other embodiments, the dispersing binder is different than the first fluoropolymer. For example, in the embodiments with ETFE as the first fluoropolymer, the dispersing binder may be a fluoropolymer other than ETFE, such as TFE/P. Still further, in certain embodiments when the dispersing binder is different than the first fluoropolymer, the dispersing binder may be a fluoropolymer that is different than both ETFE and TFE/P, such as PFA.

In other embodiments, the dispersing binder is not a fluoropolymer. In these embodiments, the dispersing binder may include any atom other than a fluorine atom. Generally, in these embodiments, the dispersing binder includes atoms selected from the group of carbon, nitrogen, oxygen, sulfur, and hydrogen. Specific examples include, but are not limited to, polypropylenes, polyethylenes, polyamides, polyesters, polycarbonates, polysulfones, aramid polymers, polyamideimides, polyimides, polyetherimides, polyetheretherketones, polyethylene terephthalate, polybutylene terephthalate, polystyrene, polyvinyl chloride, polyvinyl alcohol, polyvinyl acetate, polyacrylonitrile, polyethyleneimine, vinyl ester, epoxies, phenolics, cyanates, silicones, urethanes, bismaleimides, nadic end-capped polyimides, and combinations thereof.

Although not required, in certain embodiments, the dispersing binder is an elastomeric polymer. Specific examples include, but are not limited to, unsaturated rubbers, natural polyisoprene (e.g. cis-1,4-polyisoprene natural rubber, and trans-1,4-polyisoprene), synthetic polyisoprene, polybutadiene, chloroprene rubber (such as polychloroprene), butyl rubber (i.e., copolymers of isobutylene and isoprene), styrene-butadiene rubber, nitrile rubber, copolymer of butadiene and acrylonitrile, hydrogenated nitrile rubbers, ethylene propylene rubber, ethylene propylene diene rubber, a terpolymer of ethylene, propylene and a diene-component (EPDM), epichlorohydrin rubber (ECO), polyacrylic rubber, silicone rubber, polyether block amides (PEBA), chlorosulfonated polyethylene, ethylene-vinyl acetate (EVA), and combinations thereof.

In certain embodiments, the dispersing binder has a number average molecular weight less than 2,000 g/mol. Alternatively, the dispersing binder has number average molecular weight of from about 200 to about 2,000, from about 200 to about 1,000, from about 300 to about 900, from about 400 to about 800, from about 500 to about 700, about 400, about 600, or about 800, g/mol. In one embodiment, the dispersing binder is a polyethylene glycol having a number average molecular weight of about 400 g/mol. In another embodiment, the dispersing binder is a polyethylene glycol having a number average molecular weight from about 200 to about 100 g/mol. In another embodiment, the dispersing binder is a polyethylene glycol having a number average molecular weight from about 200 to about 1,000 g/mol.

As described above, the anti-static additive is conductive and establishes the electrical conductivity or electrical resistivity of the inner layer 110. In particular, the dispersing binder of the anti-static additive optimizes the dispersion of the carbon nanotubes within the inner layer 110 and therefore the dispersing binder and the carbon nanotubes collectively and cooperatively establish the electrical conductivity of the inner layer 110. However, the, dispersing binder may, by itself, not be conductive. Rather, the dispersing binder prevents the carbon nanotubes from agglomerating when forming the inner layer 110. In particular, carbon nanotubes have a strong tendency to agglomerate due to the high surface energy of carbon nanotubes, and the dispersing binder prevents or significantly reduces the likelihood that the carbon nanotubes will agglomerate while forming the inner layer 110. When carbon nanotubes agglomerate, a relatively higher amount of carbon nanotubes is required to achieve a given electrical conductivity. As such, although the dispersing binder may not be conductive, the dispersing binder is an essential portion of the anti-static additive. Therefore, unless the anti-static additive comprises both the carbon nanotubes and the dispersing binder, individually incorporating carbon nanotubes and a binder as separate components will not optimize the dispersion of the carbon nanotubes. Consequently, such an approach will require a relatively higher amount of carbon nanotubes to achieve a comparable electrical conductivity.

Establishing the electrical conductivity of the inner layer 110 with a relatively lower amount of anti-static additive in comparison to convention anti-static additives (e.g. carbon nanotubes without the dispersing binder) is significant, because the decreased amount of anti-static additive permits a proportional increase in the amount of the first fluoropolymer (and other components if present) in the inner layer 110. As such, because the electrical conductivity or electrical resistivity of the inner layer 110 is established with a relatively lower amount of the anti-static additive, the mechanical properties of the inner layer 110 (e.g. tensile strength) are increased due to the relatively larger amount of the first fluoropolymer (and other components if present) included in the inner layer 110. In particular, in demanding, high performance environments, such as conveying aggressive fluids under high pressure (e.g. 5,000 psi), any increase in mechanical properties without an accompanying sacrifice of electrical conductivity (i.e., the level of electrical conductivity required to dissipate a static electric charge) is significant.

As described in further detail below, in certain embodiments, the inner layer 110 is formed from a method that includes compounding agglomerations of the anti-static additive. In other words, in certain embodiments, the anti-static additive comprises agglomerations of carbon nanotubes and the dispersing binder prior to incorporating the anti-static additive into the inner layer 110. The agglomerations of the anti-static additive generally refer to collections of carbon nanotube networks, branched networks, entangled networks, crosslinked networks, networks containing carbon nanotubes sharing common walls with one another, or combinations thereof, held together (i.e., agglomerated) with the dispersing binder. As such, the agglomerations of the anti-static additive have a morphology defined by more than just the structural features of the individual carbon nanotubes. Although not required, the agglomerations of the anti-static additive may comprise multiwall carbon nanotubes and polyethylene glycol.

Without being held to any particular theory, it is believed that reducing at least a portion of the anti-static additive comprising agglomerations of carbon nanotubes and a dispersing binder allows the carbon nanotubes and the dispersing binder to cooperatively establish the electrical conductivity of the inner layer 110. Moreover, it is also believed that the resulting dispersion of carbon nanotubes in the inner layer 110, sufficiently maintains an interconnectivity of the carbon nanotubes but also disperses the carbon nanotubes throughout the inner layer 110.

In certain embodiments, the agglomerations of the anti-static additive have a flake-like morphology. Typically, the flake-like morphology of the anti-static additive has a thickness of from about 1 nm to about 35 µm, from about 10 nm to about 20 µm, from about 100 nm to about 10 µm, from about 300 nm to about 5 µm from about 400 nm to about 2 µm, or from about 600 nm to about 1 µm, or about 800 nm. The flake-like morphology of the agglomerations of the anti-static additive also generally has a length and a width that independently range from about 1 µm to about 750 µm. Suitable grades of the anti-static additive having a flake-like morphology are commercially available from Applied NanoStructured Solutions, LLC of Baltimore, Md. under the trade name as Carbon NanoStructure (CNS) Encapsulated Flake. Additional suitable agglomerated anti-static additives for use in the inner layer 110 are described in U.S. App. Pub. No. 2014/0094541, which is hereby incorporated by reference in its entirety.

Referring back to the composition of the anti-static additive, in certain embodiments, the anti-static additive consists essentially of the carbon nanotubes and the dispersing binder. The term "consists essentially of" in the context of the anti-static additive allows for the inclusion of less than 5 parts by weight of other additives based on 100 parts by weight of the anti-static additive, provided that the additives do not nullify (i.e., render useless) the conductive properties of the carbon nanotubes and the ability of the carbon nanotubes to cooperate with the dispersing binder. For example, additives that may be included in the anti-static additive may facilitate the synthesis of the individual carbon nanotubes in the anti-static additive and/or the processing of the anti-static additive. Examples of these additives may include, but are not limited to, residual catalyst(s) used during the growth of the carbon nanotubes or the reaction that produces the dispersing binder, processing aids and/or surfactants, fillers, etc.

Although not required, in other embodiments, the inner layer 110 includes a supplemental anti-static additive that is different than the anti-static additive. Typically, if the supplemental anti-static additive is present, the supplemental anti-static additive is carbon black. If present, the supplemental anti-static additive is present in an amount of from about 0.1 to about 3 parts by weight based on 100 parts by weight of the inner layer 110. Alternatively, the supplemental anti-static additive may be present in an amount of from about 0.1 to about 2.5, from about 0.2 to about 2, or from about 0.4 to about 1.5 parts by weight, based on 100 parts by weight of the inner layer 110. In one embodiment, the inner layer 110 comprises the anti-static additive in an amount of from about 0.4 to about 1.5 parts by weight, and the carbon black in an amount of from about 0.5 to about 3 parts by weight, each based on 100 parts by weight of the inner layer 110.

In certain embodiments, the inner layer 110 has an electrical resistivity of from about 10KΩ to about 100 MΩ. The electrical resistivity may be measured using industry standard test procedures. Alternatively, the inner layer 110, has an electrical resistivity of from about 100KΩ to about 80 MΩ, alternatively, from about 150KΩ to about 40 MΩ, alternatively from about 250KΩ to about 30 MΩ, alternatively, from about 400KΩ to about 10 MΩ, alternatively, from about 700KΩ to about 5 MΩ, alternatively, from about 1 MΩ to about 4 MΩ, or alternatively, from about 2 MΩ to about 3 MΩ. In general, the electrical resistivity of the inner layer 110 is capable of dissipating a static electric charge.

In certain embodiments, the inner layer 110 has an excellent tensile strength. Without being held to any particular theory, it is believed that the tensile strength is driven by the first fluoropolymer and is proportional to the relatively low amount of anti-static additive included in the inner layer 110. In other words, the excellent tensile strength is generally due to the first fluoropolymer, the first crosslinker, and the anti-static additive and their respective amounts in the inner layer 110, particularly the relatively high amount of the first fluoropolymer and the relatively low amount of the anti-static additive.

The inner layer 110 may also comprises an additional fluoropolymer that, for descriptive purposes, is described throughout as a fourth fluoropolymer. When the inner layer 110 comprises the fourth fluoropolymer, the fourth fluoropolymer is different than the first fluoropolymer. When present in the inner layer 110, the fourth fluoropolymer is present in an amount of from about 5 to about 60 parts by weight based on 100 parts by weight of the inner layer 110. Alternatively, the fourth fluoropolymer may be present in an amount of from about 5 to about 30, from about 10 to about 25, or about 20 parts by weight, based on 100 parts by weight of the inner layer 110.

In certain embodiments, the fourth fluoropolymer comprises ETFE. In other embodiments, the fourth fluoropolymer comprises PFA. In other embodiments, the fourth fluoropolymer comprises poly(propylene-tetrafluoroethylene) (TFE/P). TFE/P is a copolymer comprising a reaction product of tetrafluoroethylene and propylene. Typically, the fourth fluoropolymer is TFE/P. In other embodiments, when the first fluoropolymer is not ETFE, the fourth fluoropolymer comprises ETFE. In other embodiments, when the first fluoropolymer is not PFA, the fourth fluoropolymer comprises (PFA). Although not required, generally the first fluoropolymer is ETFE and the fourth fluoropolymer is TFE/P.

When the fourth fluoropolymer comprises TFE/P, the inner layer 110 may comprise various grades of TFE/P. For example, TFE/P may have a fluorine content of from about 45 to about 60 parts by weight fluorine based on 100 parts by weight of TFE/P. TFE/P may also have a storage modulus of from about 80 to about 550, of from about 150 to about 400, or about 300, each measured with a Rubber Process Analyzer (RPA) at 100° C. and 50 cpm. TFE/P may also have a glass transition temperature of from about −5 to about 5° C. In addition, the TFE/P may be a fully saturated TFE/P or contain portions of unsaturation. Typically, a saturated TFE/P may be particularly suitable when small particle sizes of TFE/P are desired, such as TFE/P in the form of a powder. Suitable grades of TFE/P are commercially available from Asahi Glass Company Ltd. under the trade name TFE/P®.

When the fourth fluoropolymer comprises ETFE, various grades of ETFE may be used, such as the various grades of ETFE described above. When the fourth fluoropolymer comprises PFA, various grades of PFA may be used, such as the various grades of PFA described above.

In embodiments where the inner layer 110 comprises the fourth fluoropolymer, the inner layer 110 may also comprise the reaction product of the first fluoropolymer, the fourth fluoropolymer, and the first crosslinker. Although not required in these embodiments, typically, the first fluoropolymer is ETFE, the fourth fluoropolymer is TFE/P, and the first crosslinker is TAIC.

In certain embodiments, the inner layer 110 consists essentially of the first fluoropolymer, the fourth fluoropolymer, the first crosslinker, and the anti-static additive. "Consists essentially of," as used herein relative to the inner layer 110, allows for the inclusion of other components at a total combined amount of 5 parts by weight or less, based on 100 parts by weight of the inner layer 110, provided that the inclusion of the other components do not materially affect the performance of the inner layer 110 to transport a hydraulic fluid, particularly a flammable hydraulic fluid under high pressure, while maintaining flexibility. Although not required in these embodiments, typically, the first fluoropolymer is ETFE, the fourth fluoropolymer is TFE/P, the first crosslinker is TAIC, and the first crosslinker is present in the unreacted form.

In certain embodiments, the inner layer 110 consists essentially of the anti-static additive, the first fluoropolymer, the fourth fluoropolymer, and the first crosslinker. In these certain embodiments, the first fluoropolymer is present in an amount of from about 70 to about 90 parts by weight, the fourth fluoropolymer is present in an amount of from about 5 to about 25 parts by weight, the first crosslinker is present in an amount of from about 2 to about 6 parts by weight, each based on 100 parts by weight of the inner layer 110. Although not required in these embodiments, typically, the first fluoropolymer is ETFE, the fourth fluoropolymer is TFE/P, the first crosslinker is TAIC, and the first crosslinker is present in the unreacted form. Although not required, typically the anti-static additive is present in an amount of from about 0.4 to about 1.5 parts by weight, based on 100 parts by weight of the inner layer 110. Although also not required, the anti-static additive typically comprises or consists essentially of multiwall carbon nanotubes and polyethylene glycol.

In certain embodiments, the inner layer 110 comprises a reaction product present in an amount of from about 98.8 to about 99.3 parts by weight based on 100 parts by weight of the inner layer 110 and the anti-static additive present in an amount of from about 0.7 to about 1.2 parts by weight based on 100 parts by weight of the inner layer 110. In these certain embodiments, the reaction product is formed from the first fluoropolymer present in an amount of from about 70 to about 90 parts by weight, the fourth fluoropolymer present in an amount of from about 5 to about 25 parts by weight, and the first crosslinker present in an amount of from about 2 to about 6 parts by weight, each based on 100 parts by weight of the inner layer 110. Although not required in these embodiments, typically, the first fluoropolymer is ETFE, the fourth fluoropolymer is TFE/P, and the first crosslinker is TAIC. Although also not required, the anti-static additive typically comprises or consists essentially of multiwall carbon nanotubes and polyethylene glycol.

In certain embodiments, the inner layer 110 consists essentially of the anti-static additive and a reaction product of the first fluoropolymer, the fourth fluoropolymer, and the first crosslinker. Although not required in these embodiments, typically, the first fluoropolymer is ETFE, the fourth fluoropolymer is TFE/P, and the first crosslinker is TAIC.

In certain embodiments, the inner layer 110 comprises a reaction product present in an amount of from about 98.8 to 99.3 parts by weight based on 100 parts by weight of the inner layer 110 and the anti-static additive present in an amount of from about 0.7 to about 1.2 parts by weight based on 100 parts by weight of the inner layer 110. In these certain embodiments, the reaction product is formed from the first fluoropolymer present in an amount of from about 70 to about 90 parts by weight, the fourth fluoropolymer present in an amount of from about 5 to about 25 parts by weight, and the first crosslinker present in an amount of from about 2 to about 6 parts by weight, each based on 100 parts by weight of the inner layer 110. Although not required in these embodiments, typically, the first fluoropolymer is ETFE, the fourth fluoropolymer is TFE/P, and the first crosslinker is TAIC. Although also not required, the anti-static additive typically comprises or consists essentially of multiwall carbon nanotubes and polyethylene glycol having a number average molecular weight of 400 g/mol.

In certain embodiments, the inner layer 110 consists essentially of a reaction product present in an amount of from about 98.8 to 99.3 parts by weight based on 100 parts by weight of the inner layer 110 and the anti-static additive present in an amount of from about 0.7 to about 1.2 parts by weight based on 100 parts by weight of the inner layer 110. In these certain embodiments, the reaction product is formed from the first fluoropolymer present in an amount of from about 70 to about 90 parts by weight, the fourth fluoropolymer present in an amount of from about 5 to about 25 parts by weight, and the first crosslinker present in an amount of from about 2 to about 6 parts by weight, each based on 100 parts by weight of the inner layer 110. Although not required in these embodiments, typically, the first fluoropolymer is ETFE, the fourth fluoropolymer is TFE/P, and the first crosslinker is TAIC. Although also not required, the anti-static additive typically comprises or consists essentially of multiwall carbon nanotubes and polyethylene glycol.

The inner layer 110 may also comprise a plurality of additives. The additives may include pigments, leveling/flow aids, fillers, fibers, and the like. The additives may be present in an amount from about 0.1 to about 10, of from about 1 to about 8, or from about 2 to about 6, parts by weight, based on 100 parts by weight of the inner layer 110.

In embodiments where the inner layer 110 comprises the reaction product of the first fluoropolymer, the first crosslinker and optionally, the fourth fluoropolymer, the reaction products may be produced by subjecting the inner layer 110 to radiation or other sources of energy sufficient to produce a free radical. In certain embodiments, the inner layer 110 is subjected to radiation via electron beam. Without being held to any particular theory, an electron beam is beneficial for forming the reaction product because the electron beam creates free radicals and may also create unsaturation (i.e., reaction sites) in the first and/or fourth fluoropolymer.

As best shown in FIG. 1, the present disclosure also provides the layered tube 100 having the inner layer 110 as described above and the outer layer 120. Like the inner layer 110, the layered tube 100 is flexible and suitable for use in the aerospace industry.

As described above, layered tube 100 comprises the inner layer 110 and the outer layer 120. The layered tube 100 may contain any embodiment of the inner layer 110 described above. As described herein, the inner layer 110 and the outer layer 120 cooperate to establish the performance of the layered tube 100. Specifically, the chemical make-up of the inner layer 110 and the outer layer 120 surprisingly and unexpectedly achieve a cooperative balance that allows the layered tube 100 to be flexible and able to receive the typical components commonly used in conventional hoses, and also be able to transport flammable hydraulic fluids, particularly aggressive and highly pressurized flammable hydraulic fluids, during repeated thermal cycling. As such, the chemical make-up and cooperative nature of the inner layer 110 and outer layer 120 allows the layered tube 100 to be used in environments where conventional hoses either immediately fail or quickly begin to shows visible signs of failure (e.g. "white marks").

In basic dimensions, the layered tube 100 extends axially to a predetermined length along a central longitudinal axis and has an inner diameter D3 and outer diameter D4. The dimensions of the inner diameter D3 and the outer diameter D4 can vary depending upon the particular fluid conveying application involved. In certain embodiments, the inner diameter D3 is typically from about 0.150 to about 1.100 inches. In these embodiments, the inner layer 110 may have a thickness of from about 0.005 to about 0.011 inches and the outer layer 120 may have a thickness of from about 0.030 to about 0.080 inches. As such, the outer diameter D4 is typically from about 0.185 to about 1.29 inches.

As described above, the outer layer 120 comprises the second fluoropolymer. The second fluoropolymer is the same as or different than the first fluoropolymer. The second fluoropolymer is present in an amount greater than 30 parts by weight based on 100 parts by weight of the outer layer 120. In certain embodiments, the second fluoropolymer is present in an amount of from about 60 to about 100, from about 70 to about 90, or about 80, parts by weight based on 100 parts by weight of the outer layer 120.

In certain embodiments, the second fluoropolymer comprises ETFE. In other embodiments, the second fluoropolymer comprises PFA. In other embodiments, the second fluoropolymer comprises polyvinylidene difluoride (PVDF). PVDF is the polymerization product of difluoroethylene.

When the second fluoropolymer comprises ETFE, various grades of ETFE may be used, such as the various grades of ETFE described above. When the second fluoropolymer comprises PFA, various grades of PFA may be used, such as the various grades of PFA described above. When the second fluoropolymer comprises PVDF, various grades of PVDF may be used.

In certain embodiments, the second fluoropolymer of the outer layer 120 and the first fluoropolymer of the inner layer 110 are the same fluoropolymer. For example, in certain embodiments, the first fluoropolymer and the second fluoropolymer are ETFE. Typically, when the first fluoropolymer and the second fluoropolymer polymer are ETFE the fourth fluoropolymer is TFE/P and the first crosslinker is TAIC.

As described above, in certain embodiments, the outer layer 120 also comprises the third fluoropolymer. When the outer layer 120 comprises the third polymer, the third polymer is different than the second fluoropolymer. Typically, the third fluoropolymer is TFE/P. In certain embodiments, when the second fluoropolymer does not comprises ETFE, the third fluoropolymer comprises ETFE. In other embodiments, when the second fluoropolymer does not comprises PFA the third fluoropolymer comprises PFA. In other embodiments, when the second fluoropolymer does not comprise PFA, the third fluoropolymer comprises PFA. Although not required, typically the second fluoropolymer is ETFE and the third fluoropolymer is TFE/P.

When the third fluoropolymer comprises TFE/P, various grades of TFE/P may be used, such as the various grades described above. When the third fluoropolymer comprises ETFE, various grades of ETFE may be used, such as the various grades of ETFE described above. When the third fluoropolymer comprises PFA, various grades of PFA may be used, such as the various grades of PFA described above.

When the outer layer 120 comprises the third fluoropolymer, the third fluoropolymer is present in an amount of from about 5 to about 30 parts by weight based on 100 parts by weight of the outer layer 120. Alternatively, the third fluoropolymer is present in an amount of from about 5 to about 25, from about 10 to about 25, or about 20, parts by weight based on 100 parts by weight of the outer layer 120.

In certain embodiments, the outer layer 120 comprises the second fluoropolymer present in an amount of from about 70 to about 95 parts by weight based on 100 parts by weight of the outer layer 120, and the third fluoropolymer present in an amount of from about 5 to about 30 parts by weight based on 100 parts by weight of the outer layer 120. Although not required, in these embodiments, the second fluoropolymer is typically ETFE and the third fluoropolymer typically comprises TFE/P.

In certain embodiments, the outer layer 120 consists essentially of the second fluoropolymer and the third fluoropolymer. "Consists essentially of," as used herein relative to the outer layer 120, allows for the inclusion of other components at a total combined amount of 5 parts by weight or less, based on 100 parts by weight of the outer layer 120, provided that the inclusion of the other components do not materially affect the performance of the outer layer 120 of the layered tube 100 to transport a hydraulic fluid, particularly a hydraulic fluid under high pressure, while maintaining flexibility. In another embodiment, the outer layer 120 consists essentially of ETFE and TFE/P. As a non-limiting example, "consists essentially of" in this context may allow for the inclusion of flow and leveling aids to facilitate the processing of the outer layer 120, or for pigments to color the outer layer 120.

Although not required, the outer layer 120 may also comprise a second crosslinker that is the same as or different than the first crosslinker. Like the inner layer 110, the outer layer 120 may also comprise the second crosslinker in an unreacted form. Alternatively, the outer layer 120 may comprise the reaction product of the second crosslinker and the second fluoropolymer. Like the inner layer 110, in embodiments where the outer layer 120 comprises the second crosslinker in the unreacted form, it is to be appreciated that the second crosslinker may still be capable of reacting if exposed to sufficient conditions, such as high heat or other sources of energy. For example, in one embodiment, the outer layer 120 comprises the second fluoropolymer and the second crosslinker in the unreacted form, and after some period of time (e.g. 7 days), the outer layer 120 is exposed to an electron beam. After exposure to the electron beam, the outer layer 120 comprises the reaction product of the second fluoropolymer and the second crosslinker (i.e., the second crosslinker has reacted with the second fluoropolymer such that the outer layer 120 no longer comprises the second crosslinker in the unreacted form).

Typically, the second crosslinker is a triallyl derivative of cyanuric acid. In one embodiment, the triallyl derivative of cyanuric acid is triallyl isocyanurate (TAIC). In another embodiment, the triallyl derivative of cyanuric acid comprises TAIC, triallyl cyanurate (TAC), trimethallyl isocyanurate (TMAIC), or combinations thereof. In certain embodiments, the second crosslinker is the same as the first crosslinker. For example, the first crosslinker and the second crosslinker are typically both TAIC.

In embodiments where the outer layer 120 comprises the second crosslinker, the second crosslinker may be present in an amount of from about 1 to about 10, from about 2 to about 9, from about 3 to about 8, from about 4 to about 7, or from about 5 to about 6, parts by weight based on 100 parts by weight of the outer layer 120. It is to be appreciated that these values are indicative of the amount of second crosslinker actually present in the outer layer 120. If, for example, a portion of the second crosslinker is volatilized during the forming of the outer layer 120, a person of skill in the art would be able to adjust the initial amount of second crosslinker used to obtain the final amount of the second crosslinker actually present. Alternatively, processing conditions could be controlled and/or adjusted to regulate the amount of the second crosslinker that volatizes.

In one embodiment, the outer layer 120 comprises ETFE present in an amount of from about 70 to about 90 parts by weight, TFE/P present in an amount of from about 5 to about 30 parts by weight, and the second crosslinker present in an amount of from about 1 to about 10 parts by weight, each based on 100 parts by weight of the outer layer 120.

The outer layer 120 may also comprise the plurality of additives. The additives may include pigments, leveling/flow aids, fillers, and fibers. The additives may be present in an amount of from about 0.1 to about 20, of from about 1 to about 15, of from about 3 to about 12, or of from about 6 to about 9, parts by weight, based on 100 parts by weight of the outer layer 120. For example, the additives may comprise a potassium octatitanate fiber for improving the strength of the outer layer 120.

In certain embodiments when the outer layer 120 comprises the third fluoropolymer and the second crosslinker, the outer layer 120 comprises the reaction product of the second fluoropolymer, the third fluoropolymer, and the second crosslinker.

In certain embodiments when the outer layer 120 comprises the third fluoropolymer and the second crosslinker, the outer layer 120 consists essentially of the reaction product of the second fluoropolymer, the third fluoropolymer, and the second crosslinker.

In certain embodiments, the outer layer 120 comprises the reaction product of second fluoropolymer present in an amount of from about 70 to about 90 parts by weight, the third fluoropolymer present in an amount of from about 5 to about 20 parts by weight, and the second crosslinker present in an amount of from about 1 to about 10 parts by weight, each based on 100 parts by weight of the outer layer 120.

In certain embodiments, the outer layer 120 comprises the reaction product of ETFE present in an amount of from about 70 to about 90 parts by weight, TFE/P present in an amount of from about 5 to about 20 parts by weight, and TAIC present in an amount of from about 1 to about 10 parts by weight, each based on 100 parts by weight of the outer layer 120. Without being held to any particular theory, in regards to the outer layer 120, ETFE alone is generally considered too stiff to flex, which, depending on the chemical composition of the inner layer 110, may make the layered tube 100 unsuitable for applications that require a high degree of flexibility. The inclusion of TFE/P softens the outer layer 120, relative to ETFE, to allow for flexibility. However, in certain embodiments and dependent on the chemical composition of the inner layer 110, ETFE and TFE/P alone (i.e., the use of ETFE and TFE/P without the second crosslinker), although flexible, is too soft and the layered tube 100 will not sufficiently grip the connection elements while the layered tube 100 is transporting a hydraulic fluid under high pressure. In other words, in these certain embodiments, the use of ETFE and TFE/P alone is not suitable for transporting a hydraulic fluid under high pressure, because the high pressure may loosen the connection elements from the layered tube 100. To this end, the reaction product described in this embodiment achieves a surprising and unexpected balance of properties that provides for a balance of flexibility and stiffness in the layered tube 100, and allows the layered tube 100 to grip the connection elements while the layered tube 100 is transporting a hydraulic fluid under high pressure.

The reaction product may be produced by subjecting the outer layer 120 containing the unreacted crosslinker, to radiation or other sources of energy sufficient to produce a free radical. It is to be appreciated that when the reaction product of the second crosslinker and the second fluoropolymer (and third fluoropolymer if present) is expressed as a series of weight percents pertaining to individual components, the weight percent of each individual component is the weight percent of the individual component prior to the formation of the reaction product, even though the individual components may have been chemically altered in the reaction to form the reaction product.

The reaction product may be produced by any mechanism capable of creating a free radical, such as applying radiation to the outer layer 120. For example, when the outer layer 120 comprises the second crosslinker, the reaction product of the second crosslinker, the second fluoropolymer and optionally, the third fluoropolymer may be formed by subjecting the outer layer 120 to an electron beam. It is to be appreciated that subjecting the outer layer 120 to the electron beam typically also subjects the inner layer 110 to the electron beam. In other words, both the inner layer 110 and the outer layer 120 can be cured simultaneously by subjecting the layered tube 100 to the electron beam. Without being held to any particular theory, an electron beam is beneficial for forming the reaction product because the electron beam creates free radicals and also creates unsaturation.

Although not required, generally when the inner layer 110 and/or the layered tube 100 is exposed to the radiation, the inner layer 110 and/or layered tube 100 are lightly crosslinked (i.e., the inner layer 110 or layered tube 100 have a low crosslink density). One of skill in the art would appreciate that light crosslinking includes a process that produces a reaction product that allows for greater molecular motion and ductility which is greater than what is typical of a material having a tight 3-D crosslinked network (i.e., high crosslink density). The light crosslinking can be effectuated by selecting the exposure time to the electron beam or decreasing the amount of the first and/or second crosslinker. In certain embodiments of the inner layer 110, particularly when a high degree of flexibility is required, the inner layer 110 is lightly crosslinked. In certain embodiments of the layered tube 100, both the inner layer 110 and the outer layer 120 are lightly crosslinked.

In one embodiment, the degree of crosslinking may be analyzed by quantifying the amount of swelling that occurs when the material is subjected to solvent. As the degree of crosslinking increases, the swell will go down because the materials are more tightly bound to one another. An acceptable amount of swell for the fluoropolymer blend when submerged in hydraulic fluid, such as SKYDROL®, is about 5% to about 30% by volume. In another example, an acceptable amount of swell would be about 7% to about 15% by volume.

Although not required, in certain embodiments of the layered tube 100, the inner layer 110 is in direct contact with the outer layer 120, and the inner layer 110 and the outer layer 120 are melt bonded together. Typically, when the outer layer 120 and the inner layer 110 are in direct contact, the outer and inner layer 120, 110 are co-extruded. Having the inner layer 110 and outer layer 120 in direct contact with each other and melt bonded with each other is particularly beneficial when the layered tube 100 is exposed to high pressure. When the inner layer 110 and outer layer 120 are melt bonded, the inner layer 110 is prevented from "rotating" inside of the outer layer 120, which is another defect associated with conventional hoses that transport hydraulic fluids.

In another embodiment, the layered tube 100 consists essentially of the inner layer 110 and the outer layer 120. In other words, the layered tube 100 includes only the inner layer 110 and the outer layer 120.

In one embodiment, the layered tube 100 consists essentially of (A) the inner layer 110, and (B) the outer layer 120 surrounding the inner layer 110. In this embodiment, the inner layer 110 comprises the first fluoropolymer present in an amount greater than 60 parts by weight, the first crosslinker present in an amount of from about 1 to 10 parts by weight, and the anti-static additive present in an amount of from about 0.4 to about 3 parts by weight, each based on 100 parts by weight of the inner layer 110. Also in this embodiment, the outer layer 120 comprises the second fluoropolymer present in an amount greater than 60 parts by weight based on 100 parts by weight of the outer layer 120.

In one embodiment, the layered tube 100 consists essentially of (A) the inner layer 110, and (B) the outer layer 120 surrounding the inner layer 110. In this embodiment, the inner layer 110 comprises ETFE present in an amount greater than 60 parts by weight, TAIC present in an amount of from about 1 to about 20 parts by weight, and the anti-static additive present in an amount of from about 0.4 to about 2 parts by weight, each based on 100 parts by weight of the inner layer 110. Also in this embodiment, the outer layer 120 comprises the ETFE present in an amount greater than 60 parts by weight based on 100 parts by weight of the outer layer 120.

In one embodiment, the layered tube 100 consists essentially of (A) the inner layer 110, and (B) the outer layer 120 surrounding the inner layer 110. In this embodiment, the inner layer 110 comprises the anti-static additive and a reaction product formed from ETFE present in an amount of from about 70 to about 90 parts by weight, TFE/P present in an amount of from about 5 to about 25 parts by weight, and the first crosslinker present in an amount of from about 1 to about 10 parts by weight, each based on 100 parts by weight of the inner layer 110. Also in this embodiment, the outer layer 120 comprises a reaction product formed from ETFE present in an amount of from about 60 to about 90 parts by weight, TFE/P present in an amount of from about 5 to about 30 parts by weight, and the second crosslinker present in an amount of from about 1 to about 10 parts by weight, each based on 100 parts by weight of the outer layer 120. Although not required, the anti-static additive typically comprises or consists essentially of multiwall carbon nanotubes and polyethylene glycol.

Figure 3:
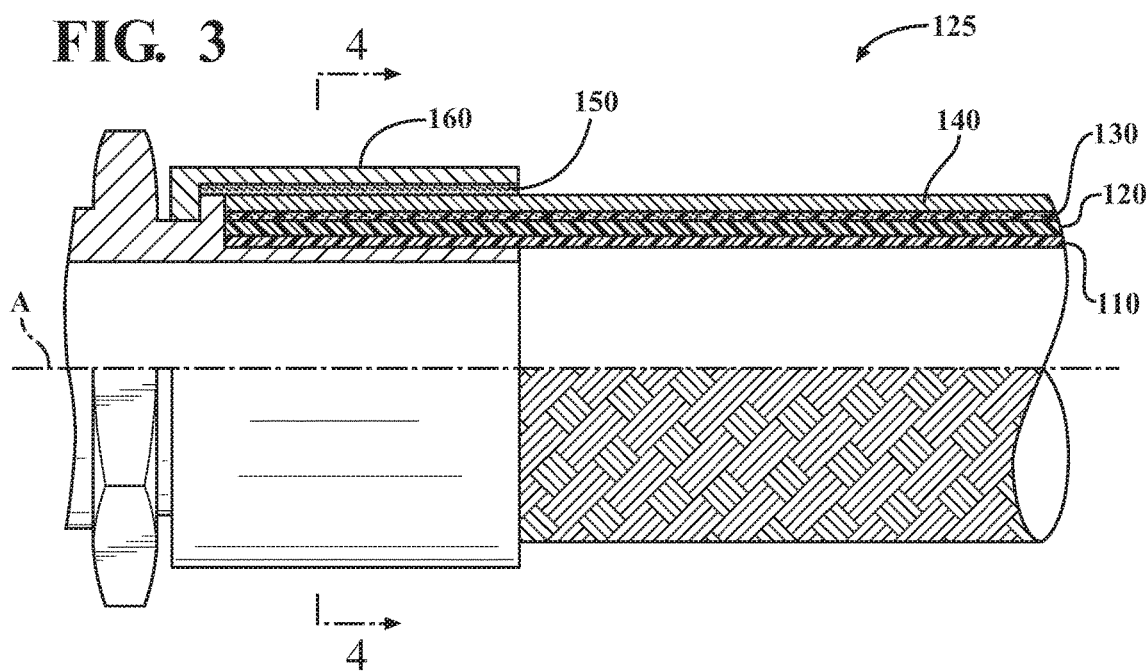
FIG. 3 is a partial cross sectional plan view of an embodiment of a hose assembly.
Figure 4:
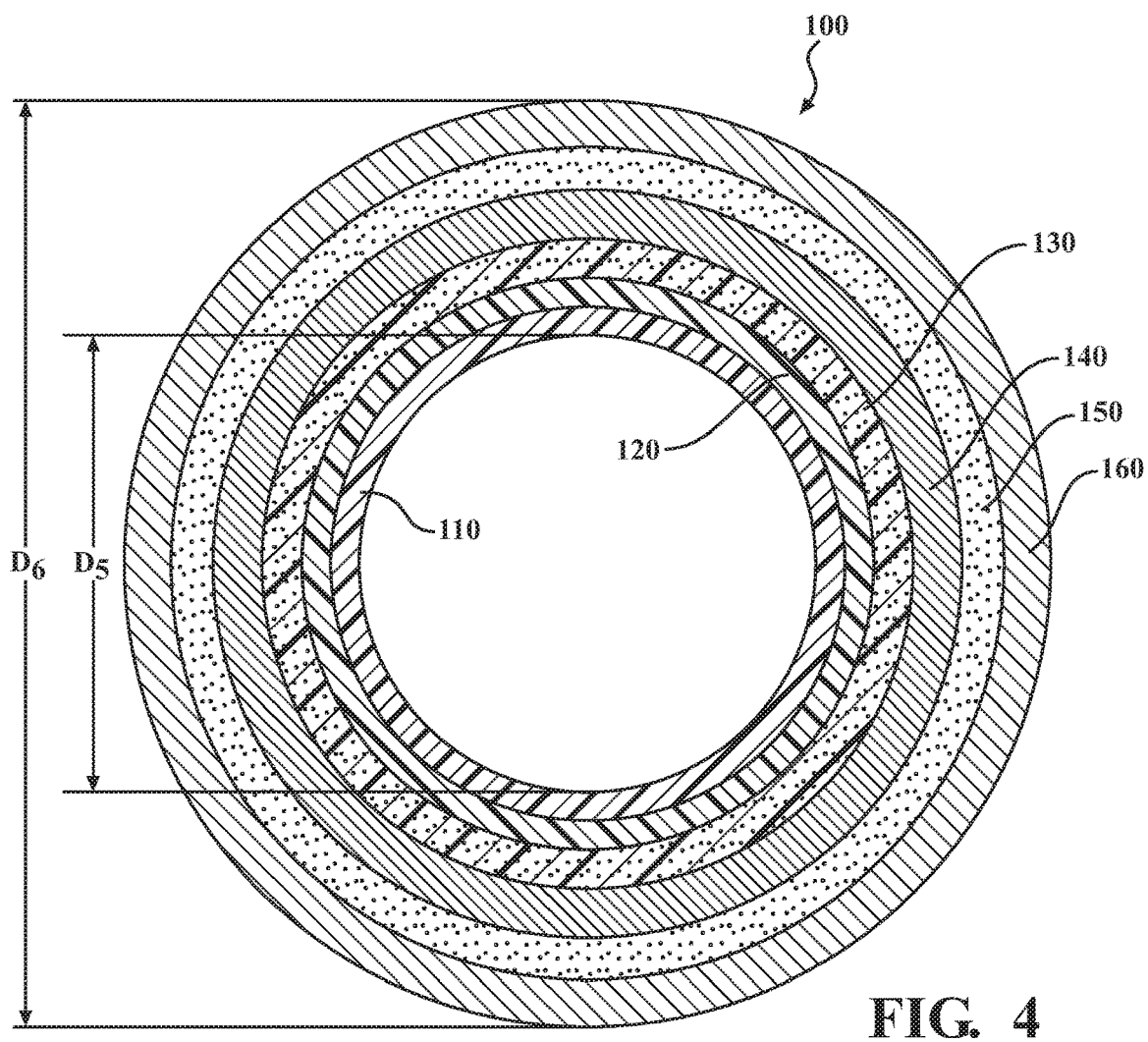
FIG. 4 is a cross sectional view of an embodiment of the hose assembly.
Figure 5:
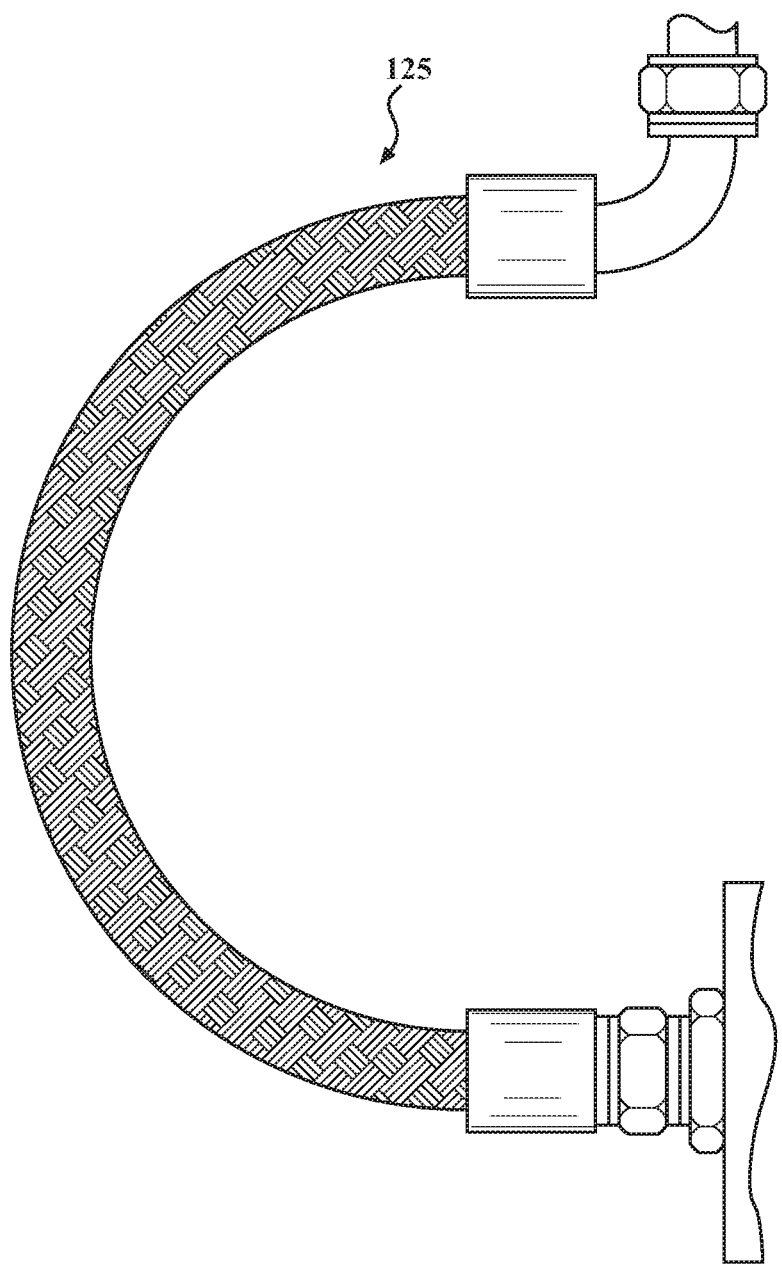
FIG. 5 is a view of an embodiment of the hose assembly bent at a minimum inside bend radius.

As best shown in FIGS. 3 to 5, the present disclosure also provides a hose assembly 125. The hose assembly 125 includes the layered tube 100. Specifically, the hose assembly 125 is a multi-layer structure that includes the inner layer 110, the outer layer 120, and a reinforcement layer 130. The hose assembly 125 may be referred to simply as a hose, or a high performance hose because of the performance of the hose assembly 125. For ease of reference, the hose assembly 125 is only referred to as the hose assembly 125 hereinafter.

The hose assembly 125 comprises the layered tube 100 and a reinforcement layer 130. The reinforcement layer 130 is constructed of para-aramid synthetic fibers.

As shown in FIG. 3, the hose assembly 125 extends axially to a predetermined length along a central longitudinal axis A. As shown in FIG. 4, the hose assembly 125 has inner diameter D5 and outer diameter D6. The dimensions of the inner diameter D5 and the outer diameter D6 can vary depending upon the particular fluid conveying application involved. In one embodiment, the hose assembly 125 conveys hydraulic fluid, such as SKYDROL®.

The inner layer 110 includes an inner surface, which defines the inner diameter D5, and an outer surface, which defines a wall thickness therebetween. As with the overall dimensions of the hose assembly 125, the wall thickness of the inner layer 110 may vary depending upon the particular fluid conveying application of the hose assembly 125.

In an alternative embodiment (not shown), an intermediate layer may be provided between the inner layer 110 and the outer layer 120, particularly if the first fluoropolymer and the second fluoropolymer are different.

The reinforcement layer 130 may be arranged in a braided orientation around the outer layer 120. Alternatively, the reinforcement layer 130 can include a spirally wound, knitted, or wrapped reinforcement material around the outer layer 120. The reinforcement layer 130 is employed in the hose assembly 125 to resist collapsing of the outer layer 120. In other words, although not required, the reinforcement layer 130 supports the structure of the layered tube 100, particularly when the hose assembly 125 is exposed to high pressure. Notably, the reinforcement layer 130 is not required to completely cover or encapsulate the outer layer 120. For example, when the reinforcement layer 130 is arranged in a braided orientation, gaps in the "braiding" may expose the outer layer 120. Moreover, the reinforcement layer 130 may not extended the complete length of outer layer 120 or the hose assembly 125. For example, the reinforcement layer 130 may be present in a location that the hose assembly 125 is bent and absent in locations where the hose assembly 125 is linear (i.e., "not bent"). Of course, the first reinforcement layer 130 may fully cover (i.e., surround/encapsulate) the outer layer 120 (e.g., 100% coverage as shown in FIG. 3) or partially cover the outer inner layer 110 (e.g., 50% coverage).

The first reinforcement layer 130 is constructed of para-aramid synthetic fibers, such as KEVLAR. In certain embodiments, para-aramid synthetic fibers strengthen the hose assembly 125 and prevents the inner layer 110 and outer layer 120 from cracking. In one embodiment, the reinforcement layer 130 is a 2×2 braid of three ends of para-aramid synthetic fibers.

Although not required, a second reinforcement layer 140 may also be included in the hose assembly 125. Like the reinforcement layer 130, the second reinforcement layer 140 may include a braided reinforcement material. Alternatively, the second reinforcement layer 140 can include a spirally wound, knitted, or wrapped reinforcement material. When the second reinforcement layer 140 is included, the second reinforcement layer 140 further reinforces the outer layer 120. Like the reinforcement layer 130, the second reinforcement layer 140 is not required to fully cover the reinforcement layer 130 or the outer layer 120. The second reinforcement layer 140 is also typically constructed of para-aramid synthetic fibers, such as KEVLAR.

In another embodiment, the hose assembly 125 further includes an adhesive layer 150. The adhesive layer 150 is typically double-sided adhesive tape constructed of a PTFE, such as TEFLON. In alternative embodiments, the adhesive layer 150 is a double sided polyester/mylar adhesive tape.

The hose assembly 125 may further comprise an outer cover 160. The outer cover 160 typically includes a braided material such as polyester fiber. Alternatively, the outer cover 160 can be metal. The outer cover 160 assists in keeping the cross-section of the outer layer 120 round as well as providing an aesthetically pleasing appearance. In addition, the polyester fiber protects the inner components from wear and abrasion. In other embodiments, the outer cover can include natural or synthetic fibers. Moreover, the outer cover 160 may include a single ply or multiple plies of materials.

In certain embodiments, the layered tube 100 meets specific performance requirements, depending on the application. In one known application, the layered tube 100 conveys fluid at a pressure of 5,080 psi (35 MPa). For safety considerations, it is desirable for the layered tube 100 to have a minimum burst pressure of 20,320 psi (140 MPa) at room temperature and a minimum burst pressure of 15,240 psi (105 MPa) at 275° F. (135° C.). It is also desirable for the layered tube 100 to pass additional safety tests, including a pressure impulse test, a push/pull test, an assembly flex test, and a thermal variation test.

In a pressure impulse test, the layered tube 100 goes through the following cycle: fluid pressure is increased from 0 to 7,620 psi (52.5 MPa), then decreased and held at 5,080 psi (35 MPa), and then decreased to 0 psi. This cycle is repeated at a rate of 70 cycles per minute. It is desirable for the layered tube 100 to pass through 300,000 cycles without failing.

In a push/pull test, the layered tube 100 is maintained in a linear orientation. A first end of the layered tube 100 is fixed, and the second end is alternately moved towards the first end, and away from the first end. This cycle is repeated at a rate of 20-60 cycles per minute. It is desirable for the layered tube 100 to pass through 50,000 cycles without failing. In certain embodiments the layered tube exceeds 300,000 cycles without failing.

In an assembly flex test, for the layered tube 100 is bent to its minimum inside bend radius R, as shown in FIG. 5 (illustrated with the hose assembly 125). A first end of the layered tube 100 is fixed, while a second end is alternately moved in a straight line parallel to the axis of the opening of the second end. For example, in FIG. 5, the top end of the layered tube 100 is fixed, and the bottom end is moved from left to right. This cycle is repeated at a rate of 60-80 cycles per minute. It is desirable for the layered tube 100 to pass through 400,000 cycles without failing.

A thermal variation test may be used to detect microscopic voids or crazing in the layered tube 100. In a thermal variation test, the hose is pressurized to 5080 psi, then brought to a temperature of 275° F. The layered tube 100 is held at that temperature for four hours. Then the layered tube 100 is cooled to −65° F. over the course of an hour. The layered tube 100 is held at −65° F. for four hours. Then the layered tube 100 is heated back up to 275° F. over the course of an hour. This completes 1 cycles. This cycle is repeated continuously until the layered tube 100 shows microscopic voids. The layered tube 100 is continuously pressurized during the temperature cycling. The layered tube 100 passes the test if it goes through 20 cycles without microscopic voids.

The present disclosure also provides a method of producing a fluoropolymer composition. The method comprises providing the anti-static additive comprising agglomerations of carbon nanotubes and the dispersing binder. The method also comprises compounding the first fluoropolymer and the first crosslinker and the anti-static additive, to produce the fluoropolymer composition with at least a portion of the agglomerations of carbon nanotubes and the dispersing binder being reduced to discrete carbon nanotubes dispersed throughout the fluoropolymer composition.

As described above, the anti-static additive comprising agglomerations of carbon nanotubes and the dispersing binder generally refers to collections of carbon nanotube networks, branched networks, entangled networks, cross-linked networks, networks containing carbon nanotubes sharing common walls with one another, or combinations thereof, held together (i.e., agglomerated) with the dispersing binder.

As also described above, without being held to any particular theory, it is believed that compounding the anti-static additive comprising agglomerations of carbon nanotubes and the dispersing binder optimizes the dispersion of the carbon nanotubes in the first fluoropolymer. In particular, the optimized dispersion occurs when the at least a portion of the agglomerations of the anti-static additive is reduced to discrete carbon nanotubes dispersed thought the fluoropolymer composition. In general, to achieve sufficient electrical conductivity, a portion of the carbon nanotubes must still be contact with other carbon tubes such that electrical contact is maintained. However, too much contact (i.e., a high degree of agglomeration) between the carbon nanotubes is also undesirable. Surprisingly, it has been discovered that compounding the anti-static additive comprising agglomerations of carbon nanotubes and the dispersing binder produces the fluoropolymer composition having excellent electrical conductivity, and it is believed this electrical conductivity is the result of at least a portion of the agglomerations of the anti-static additive being reduced to discrete carbon nanotubes dispersed throughout the fluoropolymer composition. As such, in certain embodiments, the fluoropolymer composition includes both discrete carbon nanotubes and agglomerations of carbon nanotubes with the dispersing binder, and this relationship between the discrete carbon nanotubes and the agglomerations optimizes the dispersion of the carbon nanotubes, and surprisingly produces the fluoropolymer composition having excellent electrical conductivity.

In certain embodiments, compounding the first fluoropolymer, the first crosslinker, and the anti-static additive volatizes a portion of the dispersing binder. As such, in these embodiments, the amount of dispersing binder present in the anti-static additive is decreased. Volatizing the portion of the dispersing binder aids in the reduction of the portion of the agglomerations of the anti-static additive being reduced to discrete carbon nanotubes. In addition, volatizing the portion of the dispersing binder also permits a proportionate increase in the other components of the fluoropolymer composition, and as described above, consequently improves the mechanical properties of the fluoropolymer composition.

In certain embodiments, the method further comprises extruding the fluoropolymer composition to produce the inner layer 110 defining the chamber. As such, the fluoropolymer composition is useful for forming the inner layer 110. As described above, the inner layer 110 is useful for directing fluid, including hydraulic fluids under high pressure.

In certain embodiments, the method further comprises applying radiation to the inner layer 110 to cure the inner layer 110. For example, the radiation may be applied to the inner layer 110 via an electron beam. Curing the inner layer 110 may further increase the electrical conductivity of the inner layer 110.

Although not required typically the first fluoropolymer, the first crosslinker, the anti-static additive are compounded with a twin screw extruder to form the fluoropolymer composition. The twin screw extruder is typically capable of achieving process temperatures up to 350° C. Although not required, the fluoropolymer composition may be in the form of pellets. Generally, the pellets are 0.05 to about 0.2 inches in length.

The method may also comprise extruding the fluoropolymer composition to form the inner layer 110. As such, it is to be appreciated that the fluoropolymer composition includes any compositions of the inner layer 110 described above. The extruder is typically the twin screw extruder described above. In certain embodiments, a void volume is maintained in the extruder. For example, the fluoropolymer composition may fill from about 30 to about 60 percent of the total volume of the extruder. Alternatively, the fluoropolymer composition may fill from about 40 to 55 percent of the total volume of the extruder. Maintaining the void volume in the extruder increases the shear that is applied to fluoropolymer composition because the shear force that is generated from the extruder is transferred to a relatively lower volume of the fluoropolymer composition as compared to a volume of the fluoropolymer composition where no void volume is maintained (i.e., a volume in which the extruder is full). Increasing the shear further facilitates the dispersion of the anti-static additive.

In certain embodiments of the method, varying shear rates are applied in the compounding step to further disperse the anti-static additive and to avoid subjecting particular fluoropolymers to certain processing conditions, such as too high or too low of shear as described below. Shear is a term used to convey the relative amount of stress applied to any given material. As such, if a material is sheared under high-shear as compared to low shear, a greater stress is applied to the material. However, whether shear is high or low depends on multiple factors that include the geometry of the object providing the shear. For example, two different geometries rotating at the same speed will apply different amounts of shear. However, generally speaking, if the same geometry is to rotate at differing speeds, the higher speed will apply a higher stress to the material.

In certain embodiments, compounding is further defined as compounding under high-shear. In one embodiment, compounding under high-shear comprises compounding in an extruder with a high-shear extrusion screw having an L/D ratio of about 30/1 at a revolution per minute of at least 100, more specifically 150 to 350. Alternatively, compounding under high-shear comprises compounding in an extruder with the same high-shear extrusion screw at a revolution per minute of from 200 to 350. A high-shear extrusion screw is an extrusion screw that includes a large number of kneading blocks. Comparatively speaking, a low-shear extrusion screw is an extrusion screw having fewer kneading blocks than the high-shear extrusion screw. Moreover, not only does the high-shear extrusion screw have more kneading blocks than the low shear extrusion screw, the individual kneading blocks on the high-shear extrusion screw are larger than the individual kneading blocks on the low-shear extrusion screw.

In certain embodiments, compounding is further defined as a high-shear compounding step using the high-shear extrusion screw and a low-shear compounding step using a low-shear extrusion screw. In these embodiments, in the high-shear compounding step, first fluoropolymer is compounded under high-shear with the high-shear extrusion screw at a revolution per minute of 100 to 400. In these embodiments, in the low-shear compounding step, the fourth fluoropolymer may then be added and compounded under low-shear with the low-shear extrusion screw at a revolution per minute of 100 to 300. Although there are overlaps in the associated revolutions per minute, different extruding screws are implemented, one for the high-shear compounding step, and another for the low-shear compounding step. In certain embodiments, the high-shear extrusion screw rotates at a revolution per minute of from 150 to 400, alternatively from 150 to 350, alternatively from 200 to 350, or alternatively from 250 to 350. In certain embodiments, the low shear-extrusion screw rotates at a revolution per minute of 100 to 250, or alternatively from 100 to 200.

In certain embodiments, compounding is further defined as a high-shear compounding step and a low-shear compounding step. In these embodiments, each compounding step uses the same extrusion screw. In the high-shear compounding step, compounding occurs under high-shear with the extrusion screw at a revolution per minute of greater than 200 to 400. Alternatively, in the high-shear compounding step, compounding occurs under high-shear with the extrusion screw at a revolution per minute of from 250 to 400, alternatively from 250 to 350, or alternatively from 300 to 400. In the low-shear compounding step, compounding occurs under low-shear with the extrusion screw at a revolution per minute of 200 or less. Alternatively, in the low-shear compounding step, the revolutions per minute may be from 80 to 180, from 100 to 180, or from 100 to 150.

In the embodiments described above that compound under high-shear, the high-shear further disperses the anti-static additive. As such, the high-shear further decreases the relative amount of the anti-static additive, required to achieve the desired level of electrical conductivity. As a result, compounding under high-shear also serves to improve the mechanical properties of the inner layer 110, such as the tensile strength of the inner layer 110, by enabling the inclusion of a greater amount of other components, such as the first fluoropolymer and the like.

In certain embodiments, the method further comprises compounding the second fluoropolymer and the second crosslinker to form a second fluoropolymer composition. The second fluoropolymer composition is useful for forming the outer layer 120. In these embodiments, the method may further comprise extruding the second fluoropolymer composition to form the outer layer 120 surrounding the inner layer 110 thereby forming the layered tube 100. It is to be appreciated that the second fluoropolymer composition may include any of the compositions described above relative to the outer layer 120.

Although not required, the fluoropolymer composition and the second fluoropolymer composition may be co-extruded to form the layered tube 100. When the fluoropolymer composition and the second fluoropolymer composition are co-extruded, the inner layer 110 and the outer layer 120 are typically melt bonded together.

In certain embodiments, once the layered tube 100 is formed, the method further comprises applying radiation to the layered tube 100 to cure the layered tube 100. Typically, the radiation is applied via an electron beam.

In certain embodiments, the method further comprises the step of applying radiation to the outer layer 120 to cure the layered tube 100. In other words, in these embodiments, the radiation applied to the outer layer 120 is sufficient to cure the outer layer 120 and the inner layer 110, thereby curing the layered tube 100. Although not required, the radiation is typically applied via an electron beam.

In certain embodiments, the method further comprises forming a hose assembly 125 comprising the layered tube 100 and the reinforcement layer 130 constructed of para-aramid synthetic fibers. The method may also comprise providing the outer cover 160. The method may also provide an adhesive layer 150 between the reinforcement layer 130 and the outer cover 160.

The following examples are intended to illustrate the invention and are not to be viewed in any way as limiting to the scope of the invention.

Examples

Layers constructed by compounding the Samples 1-7 are provided below in Table 1. Each Sample includes ETFE, TFE/P, an anti-static additive, and TAIC. The amount of ETFE, TFE/P, and the anti-static additive are provided as wt. % based on a combined total of 100 parts by weight of the three components. The amount of TAIC is based on 100 parts by weight of the total amount of ETFE, TFE/P, and the anti-static additive.

TABLE I

| Sample | Layer |
|---|---|
| 1 | 77.5% ETFE |
|  | 20.0% TFE/P |
|  | 2.5% Comparative Anti-static additive |
|  | 4.0% TAIC |
| 2 | 79.0% ETFE |
|  | 20.0% TFE/P |
|  | 1.0% Anti-static additive 5 |
|  | 4.0% TAIC |
| 3 | 79.3% ETFE |
|  | 20.0% TFE/P |
|  | 0.7% Anti-static additive 5 |
|  | 4.0% TAIC |
| 4 | 77.8% ETFE |
|  | 20.0% TFE/P |
|  | 2.2% Comparative Anti-static additive 1 |
|  | 4.0% TAIC |
| 5 | 76.1% ETFE |
|  | 20.0% TFE/P |
|  | 3.9% Comparative Anti-static additive 2 |
|  | 4.0% TAIC |
| 6 | 77.8% ETFE |
|  | 20.0% TFE/P |
|  | 2.2% Comparative Anti-static additive 3 |
|  | 4.0% TAIC |
| 7 | 77.8% ETFE |
|  | 20.0% TFE/P |
|  | 2.2% Comparative Anti-static additive 1 |
|  | 4.0% TAIC |

Comparative Anti-static additives 1-4 are commercially available carbon nanotubes. Notably, the Comparative Anti-static additives do not contain a dispersing binder. Anti-static additive 5 is an agglomeration of multi-walled carbon nanotubes with a polyethylene glycol dispersing binder. The polyethylene glycol has a number average molecular weight of about 400 g/mol.

Of the Samples prepared, the electrical resistivity of extruded strands prior to crosslinking were measured using techniques known to those of skill in the art and the results are shown below in Table II.

TABLE II

| Sample | Surface Resistance (Kohms) |
|---|---|
| 1 | 45 |
| 2 | 33 |
| 3 | 340 |
| 4 | 740 |
| 5 | 80 |
| 6 | 90 |
| 7 | 65 |

Notably, the surface resistance for the extruded strands containing the Anti-static additive had excellent surface resistance values in comparison to Samples containing Comparative Anti-static additives (i.e., Anti-static additives containing carbon nanotubes but not containing a dispersing binder). In particular, Sample 2 which contained merely 1 percent of the Anti-static additive had a measured surface resistance of 33 Kohms while Samples 1 and 4-7 had significantly higher surface resistance values despite having more than double the amount of carbon nanotubes. As a consequence of achieving the desired surface resistivity with only 1% of the Anti-static additive, Sample 2 also contains a higher amount of ETFE than samples 1 and 4-7, which is known to result in increased mechanical performance.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described. The subject matter of all combinations of independent and dependent claims, both singly and multiply dependent, is herein expressly contemplated.

The invention claimed is:

1. A layered tube for directing a hydraulic fluid, said layered tube comprising:
   A. an inner layer defining a chamber for directing the hydraulic fluid, said inner layer comprising;
   a first fluoropolymer present in an amount greater than 30 parts by weight based on 100 parts by weight of said inner layer,
   a first crosslinker, and
   an anti-static additive comprising a portion of discrete carbon nanotubes and a dispersing binder which is the same as or different than said first fluoropolymer; and
   B. an outer layer surrounding said inner layer and comprising a second fluoropolymer present in an amount greater than 30 parts by weight based on 100 parts by weight of said outer layer, wherein said second fluoropolymer is the same as or different than said first fluoropolymer and said dispersing binder.

2. The layered tube as set forth in claim 1 wherein said carbon nanotubes comprise multiwall carbon nanotubes.

3. The layered tube as set forth in claim 1 wherein said dispersing binder is not a fluoropolymer and consists of atoms selected from the group of carbon, nitrogen, oxygen, sulfur, and hydrogen.

4. The layered tube as set forth in claim 1 wherein said inner layer further comprises a fourth fluoropolymer, such that said inner layer comprises,
   said anti-static additive present in an amount of from about 0.7 to about 1.2 parts by weight based on 100 parts by weight of said inner layer, and
   a reaction product of,
       said first fluoropolymer present in an amount of from about 70 to about 90 parts by weight based on 100 parts by weight of said inner layer,
       said fourth fluoropolymer present in an amount of from about 5 to about 25 parts by weight based on 100 parts by weight of said inner layer, and
       said first crosslinker present in an amount of from about 2 to about 6 parts by weight based on 100 parts by weight of said layer; and
   wherein said reaction product is present in an amount of from about 98.8 to about 99.3 parts by weight based on 100 parts by weight of said inner layer.

5. The layered tube as set forth in claim 1 wherein said portion of discrete carbon nanotubes is dispersed throughout said layer by compounding agglomerations of said carbon nanotubes in said anti-static additive.

6. The layered tube as set forth in claim 1 wherein said outer layer further comprises a third fluoropolymer present in an amount of from about 5 to about 30 parts by weight based on 100 parts by weight of said outer layer, wherein said third fluoropolymer is different than said first and second fluoropolymers.

7. The layered tube as set forth in claim 6, wherein said second fluoropolymer comprises poly(ethylene-tetrafluoroethylene) and said third fluoropolymer comprises poly(propylene-tetrafluoroethylene).

8. The layered tube as set forth in claim 6 wherein said outer layer further comprises a second crosslinker present in an amount of from about 1 to about 10 parts by weight based on 100 parts by weight of said outer layer, and wherein said second crosslinker is the same as or different than said first crosslinker of said inner layer.

9. The layered tube as set forth in claim 8 wherein said outer layer comprises a reaction product of said second fluoropolymer, said third fluoropolymer, and said second crosslinker.

10. The layered tube as set forth in claim 8 wherein said outer layer comprises a reaction product of:
said second fluoropolymer present in an amount of from about 70 to about 90 parts by weight based on 100 parts by weight of said outer layer;
said third fluoropolymer present in an amount of from about 5 to about 20 parts by weight based on 100 parts by weight of said outer layer; and
said second crosslinker present in an amount of from about 1 to about 10 parts by weight based on 100 parts by weight of said outer layer.

11. The layered tube as set forth in claim 1 wherein said dispersing binder is polyethylene glycol.

12. The layered tube as set forth in claim 11 wherein said anti-static additive comprises said carbon nanotubes in an amount greater than 95 parts by weight, and said dispersing binder in an amount less than 5 parts by weight, each based on 100 parts by weight of the anti-static additive; and wherein said anti-static additive is present in an amount of from about 0.7 to about 1.2 part by weight based on 100 parts by weight of said inner layer.

13. The layered tube as set forth in claim 12 wherein said dispersing binder has a number average molecular weight less than 2,000 g/mol.

14. A layer defining a chamber for directing hydraulic fluid, said layer comprising:
a first fluoropolymer present in an amount greater than 30 parts by weight based on 100 parts by weight of said layer,
a first crosslinker, and
an anti-static additive comprising a portion of discrete carbon nanotubes and a dispersing binder which is the same as or different than said first fluoropolymer.

15. A method of producing a fluoropolymer composition, said method comprising;
providing an anti-static additive comprising agglomerations of carbon nanotubes and a dispersing binder; and
compounding a first fluoropolymer, a first crosslinker, and the anti-static additive to produce the fluoropolymer composition, wherein at least some of the agglomerations of carbon nanotubes in the anti-static additive are reduced to discrete carbon nanotubes dispersed throughout the fluoropolymer composition during said compounding.

16. The method as set forth in claim 15 wherein the dispersing binder has a number average molecular weight less than 2,000 g/mol.

17. The method as set forth in claim 15 wherein the carbon nanotubes comprise multiwall carbon nanotubes.

18. The method as set forth in claim 15 wherein the dispersing binder consists of atoms selected from the group of carbon, oxygen, hydrogen, and combinations thereof.

19. The method as set forth in claim 15 wherein the dispersing binder is polyethylene glycol.

20. The method as set forth in claim 15 wherein the anti-static additive is present in an amount of from about 0.7 to about 1.2 parts by weight based on 100 parts by weight of the fluoropolymer composition.

21. The method as set forth in claim 15 wherein said agglomerations have a flake-like morphology.

22. The method as set forth in claim 15 wherein the step of compounding volatizes a portion of the dispersing binder.

* * * * *